US007063402B2

(12) United States Patent
Bowling et al.

(10) Patent No.: US 7,063,402 B2

(45) Date of Patent: Jun. 20, 2006

(54) FLEXIBLE LAMINATION FOR USE WITH PRIMARY INK JET COMPONENTS

(75) Inventors: Bruce A. Bowling, Beavercreek, OH (US); Shaun B. Kress, Laura, OH (US)

(73) Assignee: Eastman Kodak Company, Rochester, NY (US)

( * ) Notice: Subject to any disclaimer, the term of this patent is extended or adjusted under 35 U.S.C. 154(b) by 242 days.

(21) Appl. No.: 10/720,773

(22) Filed: Nov. 24, 2003

(65) Prior Publication Data

US 2005/0110825 A1 May 26, 2005

(51) Int. Cl.
*B41J 2/16* (2006.01)
*B29C 65/48* (2006.01)

(52) U.S. Cl. .......................................... 347/20; 156/60

(58) Field of Classification Search ..................... None
See application file for complete search history.

(56) References Cited

U.S. PATENT DOCUMENTS

| | | | | |
|---|---|---|---|---|
| 6,210,522 | B1 | 4/2001 | Singh et al. | |
| 6,368,515 | B1 * | 4/2002 | Kaminishi et al. | 216/27 |
| 6,473,966 | B1 | 11/2002 | Koho et al. | |
| 6,554,399 | B1 * | 4/2003 | Wong et al. | 347/44 |

* cited by examiner

*Primary Examiner*—Huan Tran
(74) *Attorney, Agent, or Firm*—Barbara Joan Haushalter

(57) ABSTRACT

A flexible lamination method is provided for joining primary ink jet components. Essentially, the existing thermosetting construction techniques are replaced with a thermoplastic construction by replacing epoxy with sheet plastic during the lamination process. The flexible lamination joins primary ink jet components. Thermoplastic films have a high viscosity at lamination temperatures. This high viscosity holds bonding material in the area intended by elimination of wicking.

24 Claims, 4 Drawing Sheets

FLEXIBLE LAMINATION FOR USE WITH PRIMARY INK JET COMPONENTS

TECHNICAL FIELD

The present invention relates to continuous ink jet printers and more particularly to lamination of primary ink jet components.

BACKGROUND ART

In continuous ink jet printing, ink is supplied under pressure to a manifold that distributes the ink to a plurality of orifices, typically arranged in linear array(s). The ink is expelled from the orifices in jets which break up due to surface tension in the ink into droplet streams. Ink jet printing is accomplished with these droplet streams by selectively charging and deflecting some droplets from their normal trajectories. The deflected or undeflected droplets are caught and re-circulated and the others are allowed to impinge on a printing surface.

The current process for construction and assembly of the primary components used in planar charging continuous ink jet printers is stack lamination utilizing screened epoxy. However, the use of epoxy has several undesirable effects. For example, application of epoxy requires polymer screens to distribute material appropriately. These screens frequently tear and must be remade, and also must be cleaned with hazardous solvents between each use. Furthermore, the amount of epoxy applied is operator dependent, which can be problematic. Additionally, epoxy must be stored in a freezer to ensure shelf life and viability.

Primary ink jet components are precisely registered to one another after epoxy is applied. The epoxy is then cured with elevated temperatures. The ink jet hardware is constructed with various materials, hence grows thermally and also differentially. The epoxy cross-links the dimensional changes together which can be detrimental to ink jet performance. Cross-linked epoxy is rigid and difficult to remove if tooling or ink jet hardware needs to be cleaned or reclaimed for reuse. Consequently, many ink jet components are destroyed in the process of epoxy removal or component separation during the recovery process. Epoxy at lamination temperature, prior to crosslinking, exhibits extremely low viscosity. This low viscosity promotes wicking into other area of an ink jet printhead that degrades overall performance.

A need has therefore been identified for an improved technique for printhead component joining, whereby the hardware can be reused with little or no cleanup, repositioning of components can be facilitated, construction dwell time is reduced, and concerns of refrigeration, storage and shelf life are eliminated.

SUMMARY OF THE INVENTION

It is the object of the present invention to provide a printhead component joining technique utilizing thin thermoplastic stock. The technique proposed by the present invention results in several desirable attributes. With the thin thermoplastic stock, hardware can be reused with little or no cleanup, and cleanup when required is easily managed. Also, the technique of the present invention facilitates repositioning of precision components. Further more, construction dwell time is reduced by 80%, and concerns of refrigeration, storage and shelf life are eliminated.

In accordance with one aspect of the present invention, a flexible lamination method is provided for joining primary ink jet components. Essentially, the existing thermosetting construction techniques are replaced with a thermoplastic construction by replacing epoxy with sheet plastic during the lamination process. Thermoplastic films have a high viscosity at lamination temperatures. This high viscosity holds bonding material in the area intended by elimination of wicking.

Other objects and advantages of the invention will be apparent from the following description and the appended claims.

DETAILED DESCRIPTION OF THE INVENTION

In the existing art, thermosetting construction techniques are used to join ink jet components. The present invention replaces these thermosetting construction techniques with a thermoplastic construction technique. This is accomplished by replacing epoxy with sheet plastic during the lamination process.

Figure 1A:
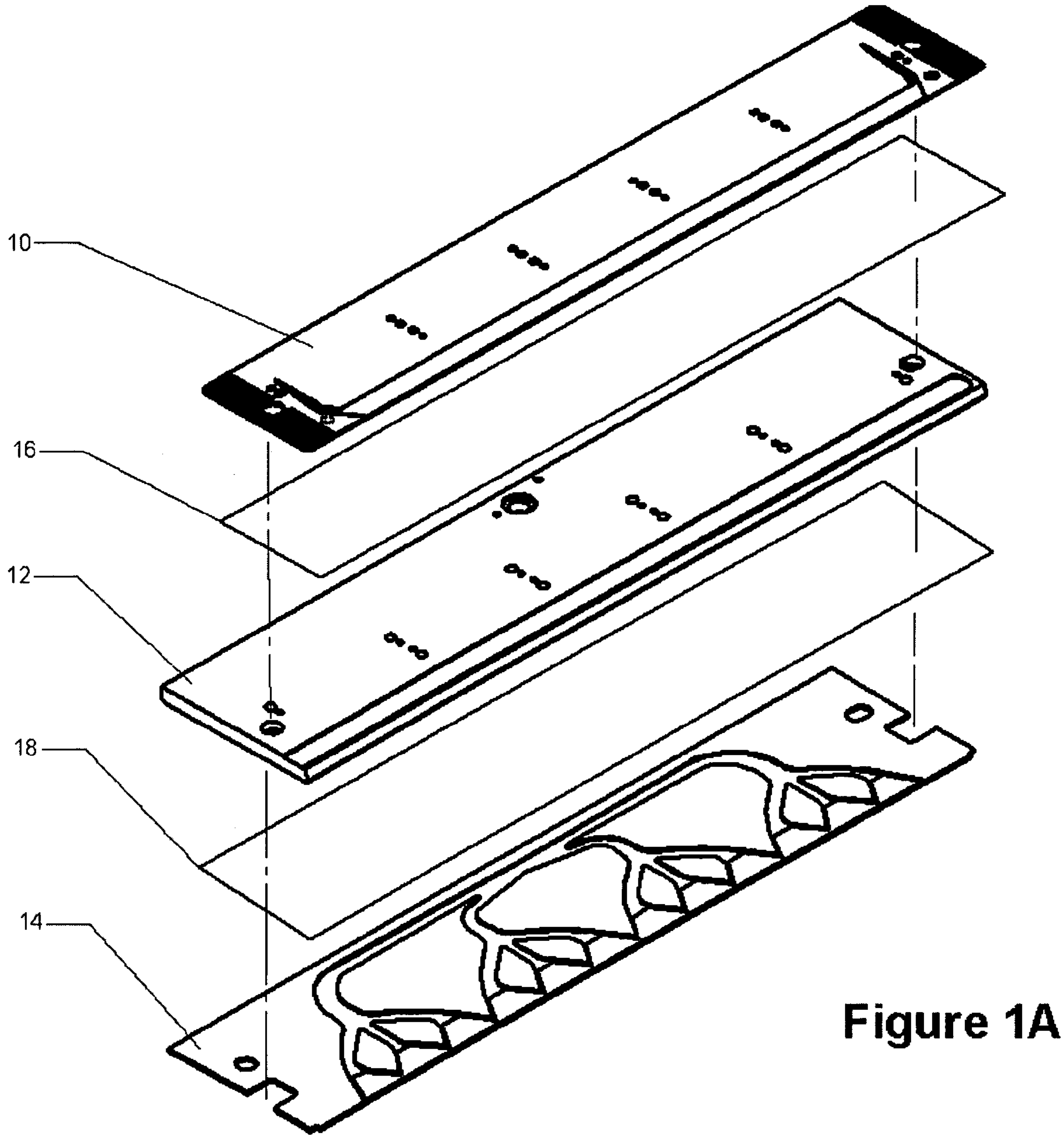
Figure 1A PRIOR ART
FIGS. 1A and 1B illustrate prior art construction arrangements for typical primary ink jet components.
Figure 1B:
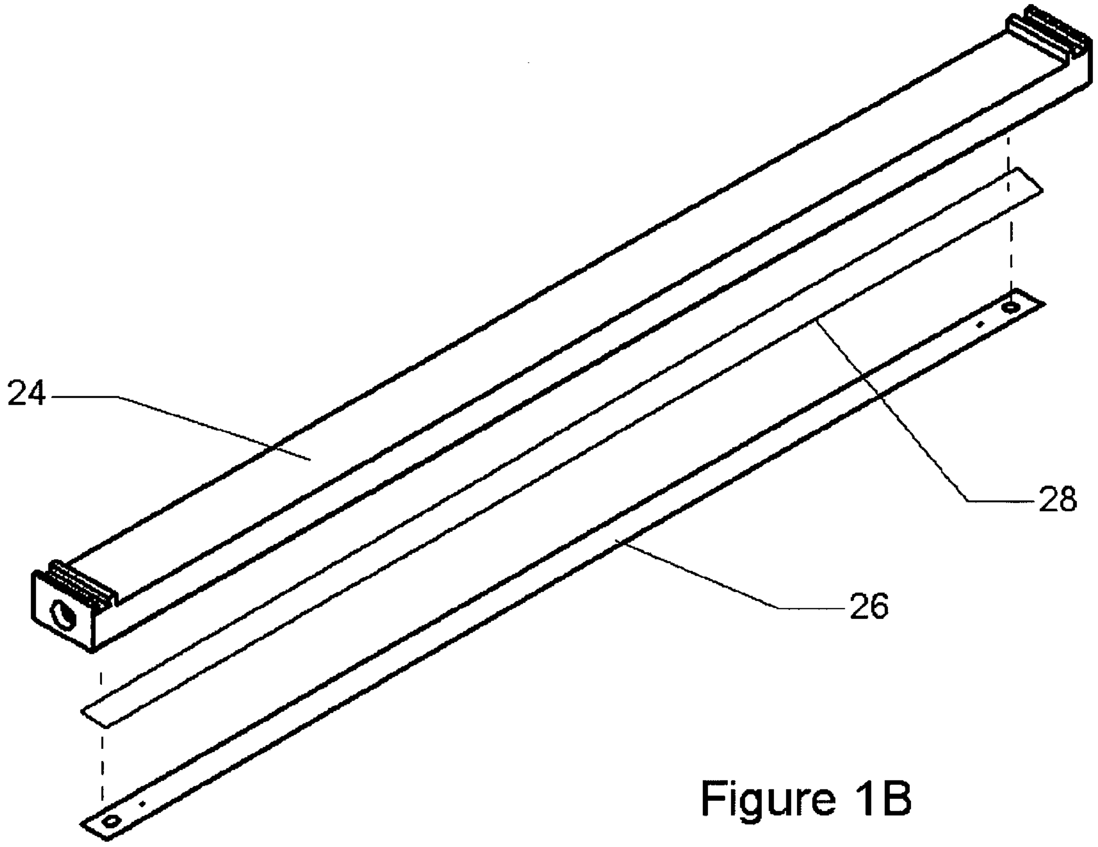
Figure 1B PRIOR ART

Referring to FIGS. 1A and 1B, prior art exploded views of ink jet components are illustrated, joined in accordance with the thermosetting construction technique of the prior art. A charge plate 10, catcher 12, and catcher plate 14, shown in FIG. 1A, are joined with thermosetting layers 16 and 18. Thermosetting layers 16 and 18 typically comprise epoxy. The primary ink jet components 10, 12, and 14 are precisely registered to one another after the epoxy is applied. The epoxy is then cured with elevated temperatures.

Similarly, referring to FIG. 1B, droplet generator 24 and orifice plate 26 are joined with thermosetting layer 28. Again, the thermosetting layer 28 is typically comprised of an epoxy. Polymer screens are required to appropriately distribute the epoxy upon application of the epoxy. Unfortunately, these screens tear frequently and must be remade, as well as require cleaning between each use with hazardous solvents.

Figure 2A:
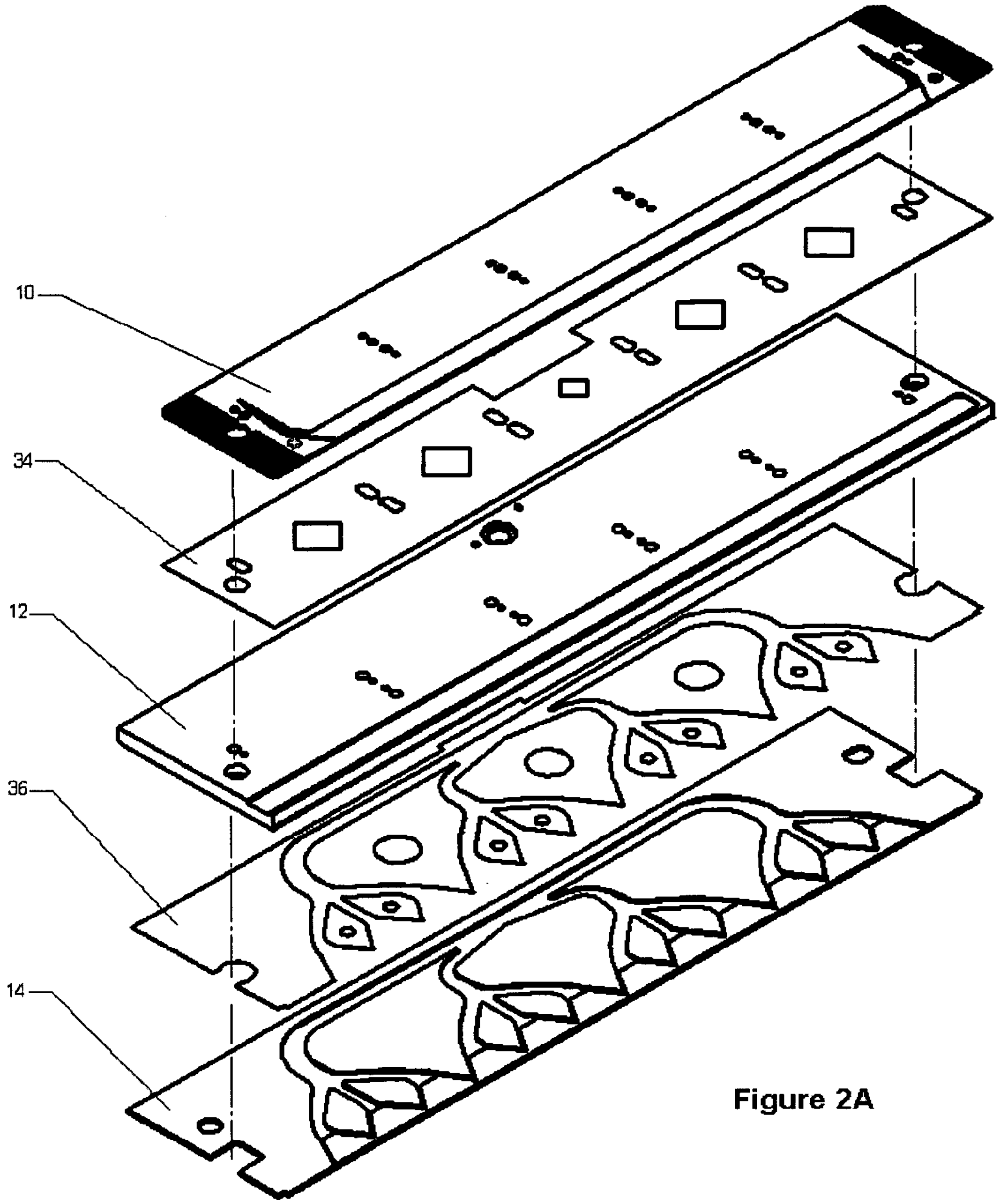
FIGS. 2A and 2B illustrate typical primary ink jet components constructed with thermoplastic sheet, in accordance with the present invention.
Figure 2B:
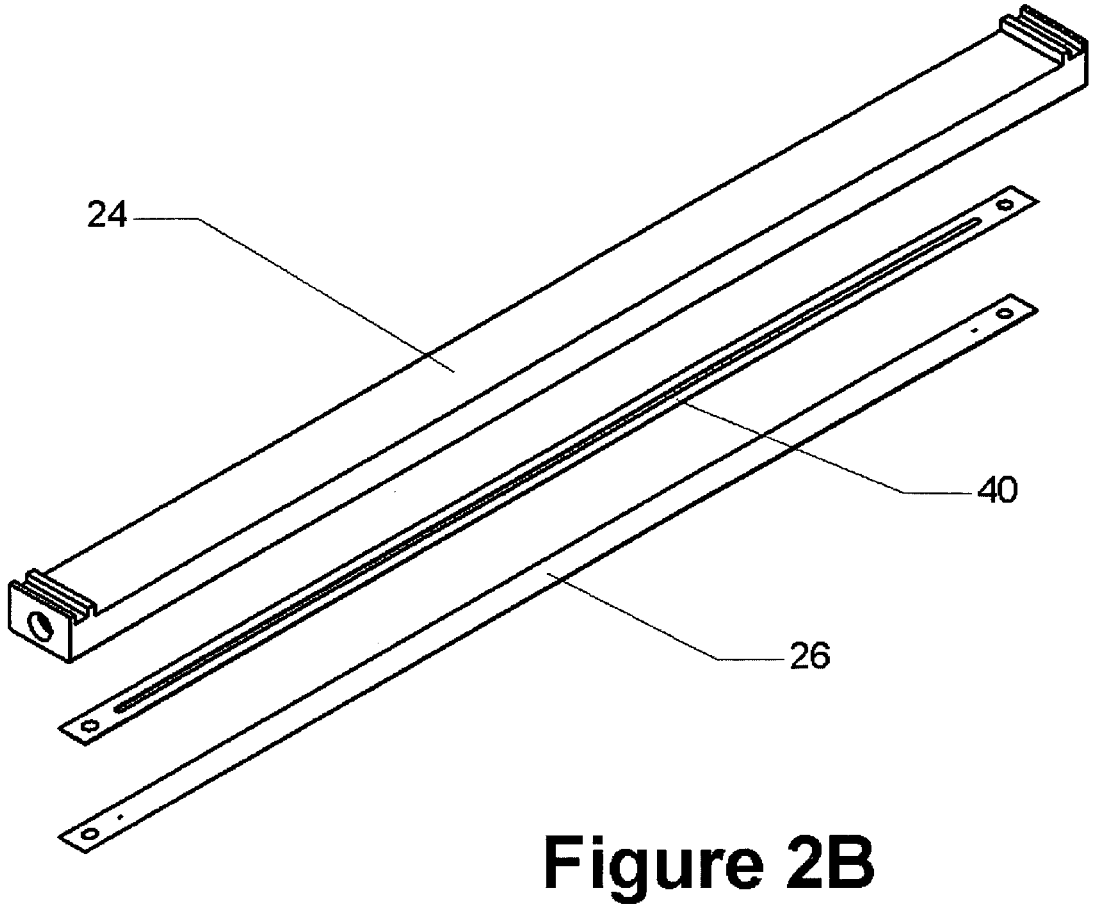

The present invention, illustrated in FIGS. 2A and 2B, replaces the prior art thermosetting construction techniques illustrated in FIGS. 1A and 1B, with a thermoplastic construction, according to the present invention. This is accomplished by replacing the epoxy with a flexible lamination thermoplastic adhesive material during the lamination process. The flexible lamination thermoplastic adhesive material may comprise any suitable lamination material such as sheet plastic, plastic film stock, or thermoplastic stock.

In a preferred embodiment of the present invention, the flexible lamination layer comprises thermoplastic adhesive film. To bond parts together with such an adhesive, the adhesive film is placed between the parts, pressure is applied to the parts, and the temperature is raised above the softening temperature of the material. The non-curing thermoplastic adhesive stock preferably comprises a thermoplastic adhesive having a softening temperature between 90° C. and 200° C., and even between 120 and 140 degrees. Typically, the thermoplastic material needs to be kept at the bonding temperature (slightly above the softening temperature) for only a few seconds after which it can be cooled to room temperature. Unlike B-stage epoxy film adhesives, the preferred thermoplastic film adhesives are non-curing. Therefore, the material will again soften when heated above the material defined softening temperature.

While those skilled in the art will recognize that a variety of suitable flexible laminates are commercially available, one preferred flexible laminate material is 3M Thermo-Bond Film 845 EG. This material, which has a modified polyolefin base resin, has been found to be compatible with the high ph (>9) aqueous inks used in our printers. In selecting an appropriate thermoplastic adhesive, it is necessary to select ones having softening temperatures significantly above the expected temperatures to be encountered by the product. In a preferred embodiment, therefore, the non-curing thermoplastic adhesive stock comprises a non-curing thermoplastic adhesive stock that is resistant to high ph inks. The softening and bonding temperature should also be below the temperature at which any part is damaged or degraded. The 3M Thermo-Bond Film 845 EG has a softening temperature about 129° C., which is acceptable for our applications. While the material softens above its softening temperature, it still remains quite viscous. Therefore, there is essentially no undesirable wicking flow of the material. Unlike the epoxy used in the prior art, the 3M Thermo-Bond Film 845 EG remains sufficiently flexible as it cools down from the bonding temperature to prevent the differenctial thermal expansion from distorting the assembly.

The desired thickness of the flexible laminate is in the range of approximately 0.0025". While the thickness of the flexible laminate may vary without departing from the scope of the invention, the purpose of this thickness selection is to keep the catcher assembly thickness similar to the existing catcher assembly thickness that uses an epoxy layer.

The thermoplastic stock is elastic by nature, and so reduces lamination stress between components. During the lamination process, the thermoplastic stock exhibits high viscosity, reducing material flow into areas that degrade printhead performance.

An advantage of using thermoplastic stock is that the thermoplastic stock can be taken back through its glass transition and made soft again. Once the primary ink jet components 10, 12, and 14, and 24 and 26, are laminated or otherwise joined, the parts can be repositioned if needed by reapplying heat and moving the parts into their desired positions before cooling the thermoplastic. To disassemble the ink jet components, heat can be reapplied to the separate pieces with minimal effort.

Consequently, in FIG. 2A, the charge plate 10 and the catcher 12 are joined with a thermoplastic film layer 34; and the catcher 12 is likewise joined to the catcher plate 14 with a second thermoplastic film layer 36. Similarly, in FIG. 2B, the droplet generator 24 is joined to the orifice plate 26 with a thermoplastic film layer 40.

With the construction of the present invention, the delicate screens used in the prior art constructions to apply epoxy to the various components, are not required in the joining of the ink jet components constructed according to the present invention. A further advantage of the thermoplastic construction of the present invention is that the thermoplastic sheets can be stored at room temperature, and do not have a shelf life, unlike epoxy which requires storage in a freezer to ensure shelf life and viability.

The thermoplastic film around five times thicker than prior art epoxy. Epoxy cannot be made thicker because the additional material would overflow during the lamination process into areas that would degrade ink jet performance. The thermoplastic film does not flow at bonding/lamination temperature and hence can be used in a "thicker" state. This additional thickness of the thermoplastic creates thermal isolation between precision ink jet components. Thermal isolation facilitates better temperature control and promotes condensation removal from the charge plate.

The flexible laminate layers 34, 36 and 40, can be supplied in limitless stamped configurations immediately ready for use. The sheet thickness, shape, heat and pressure are easily controlled so that displacement of material during lamination is minimal. In accordance with a usual application of the present invention, the components will be heated to 250 degrees Fahrenheit, with a pressure of approximately 10 psi.

When epoxy is used to bind an ink jet catcher/charge plate assembly together, as in the prior art, the charge plate and catcher thermally grow through the heating cycle, along with the epoxy. The charge plate and catcher are fixed together at the expanded state when the epoxy cross-links. As the assembly cools, the thermal differential between the catcher and charge plate create an undesirable bow across the charge plate face and its mounting plane. These bi-directional bows are detrimental to ink jet printhead performance.

With the construction of the present invention, bonding is with thermoplastic film, therefore negating the bow in a finished assembly. The thermoplastic film is elastic and therefore does not cause the assembly to bow during the curing process, yet constrains the ink jet hardware to the desired level of precision. This elimination of lamination distortion is an additional advantage to the construction proposed by the present invention.

The invention has been described in detail with particular reference to certain preferred embodiments thereof, but it will be understood that modifications and variations can be effected within the spirit and scope of the invention.

What is claimed is:

1. A method for joining components of an ink jet printhead to negate a bow in a finished assembly, the method comprising the steps of:

providing at least two contiguous ink jet printhead components required to be joined; and providing a flexible lamination layer between the at least two contiguous ink jet components to join the at least two ink jet components, wherein the flexible lamination layer comprises thermoplastic stock that can be heated back through a softening temperature to facilitate component separation for reuse, that exhibits high viscosity during a lamination process to reducing material flow into areas that degrade printhead performance, that comprises a thermal barrier, and that promotes improved charge plate condensation removal.

2. A method as claimed in claim 1 wherein the at least two contiguous ink jet printhead components comprises a plurality of series contiguous ink jet components.

3. A method for joining components of an ink jet printhead to negate a bow in a finished assembly, the method comprising the steps of:

providing at least two contiguous ink jet printhead components required to be joined; and providing a flexible lamination layer between the at least two contiguous ink jet components to join the at least two ink jet components, wherein the flexible lamination layer comprises non-curing thermoplastic adhesive stock.

4. A method as claimed in claim 3 wherein the non-curing thermoplastic adhesive stock comprises thermoplastic stock having a thickness of approximately 0.0025".

5. A method as claimed in claim 3 wherein the non-curing thermoplastic adhesive stock facilitates re-positioning of precision ink jet components.

6. A method as claimed in claim 3 wherein the non-curing thermoplastic adhesive stock comprises elastic thermoplastic stock for reducing lamination stress between components.

7. A method for joining components of an ink jet printhead to negate a bow in a finished assembly, the method comprising the steps of:

providing at least two contiguous ink jet printhead components required to be joined; and providing a flexible lamination layer between the at least two contiguous ink jet components that is heated to join the at least two ink jet components, wherein the flexible lamination layer comprises thermoplastic adhesive stock that can be re-heated above a softening temperature to re-position the at least two contiguous ink jet printhead components.

8. A method for joining components of an ink jet printhead to negate a bow in a finished assembly, the method comprising the steps of:

providing at least two contiguous ink jet printhead components required to be joined; and providing a flexible lamination layer between the at least two contiguous ink jet components to join the at least two ink jet components, wherein the flexible lamination layer comprises non-curing thermoplastic adhesive stock such that the lamination layer can be taken repeatedly back through a softening temperature to facilitate component separation for reuse.

9. A method as claimed in claim 8 wherein the non-curing thermoplastic adhesive stock comprises a modified polyolefin.

10. A method as claimed in claim 8 wherein the non-curing thermoplastic adhesive stock comprises a non-curing thermoplastic adhesive stock that is resistant to high ph inks.

11. A method as claimed in claim 8 wherein the non-curing thermoplastic adhesive stock comprises a thermoplastic adhesive having a softening temperature between 90° C. and 200° C.

12. A system for joining components of an ink jet printhead to negate a bow in a finished assembly, comprising:

at least two contiguous ink jet printhead components required to be joined; and a flexible lamination layer between the at least two contiguous ink jet components to join the at least two ink jet components, wherein the flexible lamination layer comprises non-curing thermoplastic adhesive stock.

13. A system for joining components of an ink jet printhead to negate a bow in a finished assembly, comprising:

at least two contiguous ink jet printhead components required to be joined; and a flexible lamination layer between the at least two contiguous ink jet components that is heated to join the at least two ink jet components, wherein the flexible lamination layer comprises thermoplastic adhesive stock that can be re-heated above a softening temperature to re-position the at least two contiguous ink jet printhead components.

14. A system as claimed in claim 12 wherein the non-curing thermoplastic adhesive stock comprises thermoplastic stock having a thickness of approximately o.0025".

15. A system as claimed in claim 12 wherein the non-curing thermoplastic adhesive stock comprises elastic thermoplastic stock for reducing lamination stress between components.

16. A system for joining components of an ink jet printhead to negate a bow in a finished assembly, comprising:

at least two contiguous ink jet printhead components required to be joined; and a flexible lamination layer between the at least two contiguous ink jet components to join the at least two ink jet components, wherein the flexible lamination layer comprises thermoplastic stock that can be taken back through a glass transition and made soft to facilitate component separation for reuse.

17. A system for joining components of an ink jet printhead to negate a bow in a finished assembly, comprising:

at least two contiguous ink jet printhead components required to be joined; and a flexible lamination layer between the at least two contiguous ink jet components to join the at least two ink jet components, wherein the flexible lamination layer comprises thermoplastic stock that exhibits high viscosity during a lamination process, reducing material flow into areas that degrade printhead performance.

18. A system for joining components of an ink jet printhead to negate a bow in a finished assembly, comprising:

at least two contiguous ink jet printhead components required to be joined; and a flexible lamination layer between the at least two contiguous ink jet components to join the at least two ink jet components, wherein the flexible lamination layer comprises thermoplastic stock that comprises a thermal barrier.

19. A system for joining components of an ink jet printhead to negate a bow in a finished assembly, comprising:

at least two contiguous ink jet printhead components required to be joined; and a flexible lamination layer between the at least two contiguous ink jet components to join the at least two ink jet components, wherein the flexible lamination layer comprises thermoplastic stock that promotes improved charge plate condensation removal.

20. A method for joining components of an ink jet printhead to negate a bow in a finished assembly, the method comprising the steps of:

providing at least two contiguous ink jet printhead components required to be joined; and providing a flexible lamination layer between the at least two contiguous ink jet components to join the at least two ink jet components, wherein the flexible lamination layer comprises thermoplastic stock that can be taken back through a glass transition and made soft to facilitate component separation for reuse.

21. A method for joining components of an ink jet printhead to negate a bow in a finished assembly, the method comprising the steps of:

providing at least two contiguous ink jet printhead components required to be joined; and providing a flexible lamination layer between the at least two contiguous ink jet components to join the at least two ink jet components, wherein the flexible lamination layer comprises thermoplastic stock that exhibits high viscosity during a lamination process, reducing material flow into areas that degrade printhead performance.

22. A method for joining components of an ink jet printhead to negate a bow in a finished assembly, the method comprising the steps of:

providing at least two contiguous ink jet printhead components required to be joined; and providing a flexible lamination layer between the at least two contiguous ink jet components to join the at least two ink jet components, wherein the flexible lamination layer comprises thermoplastic stock that comprises a thermal barrier.

23. A method for joining components of an ink jet printhead to negate a bow in a finished assembly, the method comprising the steps of:

providing at least two contiguous ink jet printhead components required to be joined; and providing a flexible lamination layer between the at least two contiguous ink jet components to join the at least two ink jet components, wherein the flexible lamination layer comprises thermoplastic stock that promotes improved charge plate condensation removal.

24. A system for joining components of an ink jet printhead to negate a bow in a finished assembly, comprising:

at least two contiguous ink jet printhead components required to be joined; and a flexible lamination layer between the at least two contiguous ink jet components to join the at least two ink jet components, wherein the flexible lamination layer comprises non-curing thermoplastic adhesive stock such that the lamination layer can be taken repeatedly back through a softening temperature to facilitate component separation for reuse.

* * * * *